United States Patent
Petolino, Jr. et al.

[11] Patent Number: 5,958,041
[45] Date of Patent: Sep. 28, 1999

[54] LATENCY PREDICTION IN A PIPELINED MICROARCHITECTURE

[75] Inventors: Joseph Anthony Petolino, Jr., Palo Alto; William Lee Lynch, La Honda; Gary Raymond Lauterbach, Los Altos; Chitresh Chandra Narasimhaiah, San Jose, all of Calif.

[73] Assignee: Sun Microsystems, Inc., Del.

[21] Appl. No.: 08/883,416

[22] Filed: Jun. 26, 1997

[51] Int. Cl.$^6$ ....................................................... G06F 9/30
[52] U.S. Cl. .......................................... 712/214; 712/219
[58] Field of Search .................................. 712/210, 213, 712/214, 215, 216, 217, 219, 220, 227, 23, 218, 245, 41; 713/401, 502

[56] References Cited

U.S. PATENT DOCUMENTS

| | | | |
|---|---|---|---|
| 4,760,519 | 7/1988 | Papworth et al. | 395/393 |
| 5,127,093 | 6/1992 | Moore, Jr. | 395/393 |
| 5,150,470 | 9/1992 | Hicks et al. | 395/393 |
| 5,542,061 | 7/1996 | Omata | 395/390 |
| 5,555,432 | 9/1996 | Hinton et al. | 395/800.23 |

*Primary Examiner*—Viet D. Vu
*Attorney, Agent, or Firm*—Skjerven, Morrill, MacPherson, Franklin & Friel, LLP; Samuel G. Campbell, III.

[57] ABSTRACT

The present invention solves the problems associated with the prior art by providing a latency prediction bit (LPB) to indicate the latency with which an instruction should be executed, implicitly indicating whether a data dependency is likely to exist and the likelihood of that dependency causing a hazard. In a processor according to the present invention, an instruction dependent upon a given LDI instruction is issued a given number of machine cycles after that LDI instruction, the number of machine cycles being based on the value of the LPB associated with that LDI instruction. The LPB's value, in turn, depends on whether data will need to be forwarded to the functional unit involved during the execution of LDI instruction. The ability to predict such hazards is important in maintaining a pipeline's throughput and avoiding unnecessary recirculations.

20 Claims, 7 Drawing Sheets

LATENCY PREDICTION IN A PIPELINED MICROARCHITECTURE

CROSS-REFERENCE TO RELATED APPLICATIONS

This application is related to U.S. patent application No. 08/883,639, filed Jun. 26, 1997 entitled "LOAD INSTRUCTION STEERING IN A DUAL DATA CACHE MICROARCHITECTURE," having Joseph Anthony Petolino, William Lee Lynch, Gary Raymond Lauterbach, and Kalon S. Holdbrook as inventors. This application is also assigned to Sun Microsystems, Inc., the assignee of the present invention, and is hereby incorporated by reference.

BACKGROUND OF THE INVENTION

The present invention relates to a method and apparatus for executing instructions in a computer. More specifically, the present invention relates to a method and apparatus for predicting the latency required between the execution of two related instructions.

Pipelining is an implementation technique whereby multiple instructions are overlapped in execution. A pipeline (also known as a functional unit) completes each instruction in a series of steps called pipeline stages. Instructions "enter" at one end of the pipeline, are processed through the stages, and "exit" at the other end (i.e., their intended effects are carried out). The throughput of the pipeline is determined by how often instructions are completed in the pipeline. The time required to move an instruction one step down the pipeline is known as a machine cycle. The length of a machine cycle is determined by the time required by the slowest pipeline stage because all the stages must proceed at the same time. In this type of architecture, as in most, the chief means of increasing throughput is reducing the duration of the clock cycle.

However, an alternative to increasing the clock frequency is to employ more than one pipeline. In systems employing multiple pipelines, instructions are dispatched by a scheduler or similar hardware construct. Instructions may be dispatched to the pipelines based on numerous factors, such as pipeline availability, op-code type, operand availability, data dependencies, and other considerations.

When using pipelines, conditions can exist that prevent the next instruction in the instruction stream from executing during its designated clock cycle. Known as pipeline hazards (or, simply, hazards), these conditions can impair the performance increases provided by pipelining. A hazard is created whenever a dependence exists between instructions that execute closely enough to change the order of access to an operand.

Broadly, three classes of hazards exist. The first of these is structural hazards, which arise from resource conflicts when the hardware cannot support all possible combinations of instructions in simultaneous overlapped execution. The second class of hazards are control hazards, which arise from the pipelining of branches and other instructions that change the program counter. Finally, data hazards arise when an instruction depends on the results of a previous instruction in a way that is exposed by the overlapping of instructions in the pipeline.

In the latter case, the order of access to operands is changed by the pipeline versus the normal order encountered by sequentially executing instructions. For example, consider the pipelined execution of the instructions shown in Table 1.

TABLE 1

Ememplary code segment containing a data hazard.

| Instruction | Destination | Source 1 | Source 2 |
|---|---|---|---|
| ADD | R1 | R2 | R3 |
| SUB | R4 | R1 | R5 |

The SUB instruction has a source operand, R1, that is the destination of the ADD instruction. The ADD instruction writes the value of R1 in the write-back stage of the pipeline, but the SUB instruction reads the value while in the pipeline's instruction decode stage. This causes a data hazard because the SUB instruction may be decoded prior to the ADD instruction completing (i.e., writing its results back). Unless precautions are taken to prevent it, the SUB instruction will attempt to read and use the wrong value. In fact, the value used by the SUB instruction is not even deterministic: Although it might seem logical to assume that SUB would always use the value of R1 that was assigned by an instruction prior to ADD, this is not always the case. If an interrupt should occur between the ADD and SUB instructions, the write-back stage of the ADD will complete, and the value of R1 at that point will be the result of the ADD. This unpredictable behavior is unacceptable in an interlocking pipeline.

Data hazards may be classified as one of three types, depending on the order of read and write accesses in the instructions. By convention, the hazards are named by the ordering in the program that must be preserved by the pipeline. Considering two instructions I and J, with I occurring before J, three types of data hazards may occur.

First is the read-after-write (RAW) hazard. In this case, J tries to read a source before I writes it, so J incorrectly gets the old value. This is the most common type of hazard, and is exemplified by the example illustrated by Table 1. Second is the write-after-read (WAR) hazard. In this case, J tries to write a destination before it is read by I, so I incorrectly gets the new value. This hazard occurs when there are some instructions that write results early in the instruction pipeline, and other instructions that read a source after a write of an instruction later in the pipeline. Third is the write-after-write (WAW) hazard. In this case, J tries to write an operand before it is written by I. The writes end up being performed in the wrong order, leaving the value written by I rather than the value written by J in the destination. This hazard is present only in pipelines that write in more than one pipeline stage (or allow an instruction to proceed even when a previous instruction is stalled). The read-after-read (RAR) case, of course, cannot create a hazard.

While the hazards presented above involve register operands, it is also possible for a pair of instructions to create a dependence by writing and reading the same memory location (assuming a register-memory microarchitecture is employed). Cache misses can cause memory references to get out of order if we allowed the processor to continue working on later instructions while an earlier instruction that missed the cache was accessing memory.

The data dependency problem in the example shown in Table 1 can be solved with a simple hardware technique called forwarding. Using this technique, the microarchitecture always feeds the arithmetic-logic unit (ALU) result back to the multiplexer at the ALU's input latches. If the forwarding hardware detects that the previous ALU operation has written to the register corresponding to a source for the current ALU operation, control logic selects the forwarded result as the ALU input rather than the value read from the register file, thus avoiding reading the stale data still contained therein. However, it is desirable to reduce the number of dependency cases that require forwarding, since each case requires the inclusion of additional hardware in the microarchitecture.

In this example, each such case requires a latch and a pair of comparators which examine whether the instructions having a dependency relationship share a destination and a source. Two ALU result buffers are needed to hold the ALU results to be stored because each instruction in the exemplary instruction set have two operands, either of which might encounter a hazard. For ALU operations, the result is always forwarded when the instruction using the result as a source enters the pipeline. The results held in the buffers can be inputs into either port of the ALU, via a pair of multiplexers. The multiplexers can be controlled by either the processor's control unit (which must then track the destinations and sources of all operations in the pipeline) or locally by logic associated with the forwarding operations supported (in which case the bypass buffers will contain tags giving the register numbers for which the values are destined).

In either event, the logic must determine if an uncompleted instruction wrote a register that is the input to the current instruction. If so, the multiplexer selects are set to choose from the appropriate result register rather than from the standard inputs. Forwarding can be generalized to include passing data from any appropriate architectural element to the functional unit that requires the data. In such a system, data may be forwarded from a stage of one functional unit or other element to the input of another functional unit, rather than just from the output of a functional unit to the input of the same unit. Forwarding allows the resolution of such data dependencies without incurring performance penalties. However, such situations may entail significant amounts of time compared to the normal latencies encountered in instruction processing, if the immediate forwarding of data is not supported for the given case. Immediate forwarding may not be supported for several reasons, including design constraints, infrequency of occurrence, or for other reasons. Such situations are the focus of the present invention.

Not all data hazards can be handled without a performance penalty, however. For example, the existence of data hazards in pipelined microarchitectures can make it necessary to stall the pipeline(s) affected, even if forwarding hardware is provided, as there is no way to make the determination early enough (as the addressing cannot be performed in zero time). A stall in a pipelined microarchitecture often requires that some instructions be allowed to proceed, while others are delayed. Typically, when an instruction is stalled, all instructions later in the pipeline (i.e., younger) than the stalled instruction are also stalled. Instructions earlier (i.e., older) than the stalled instruction can continue, but no new instructions are fetched during the stall.

For example, load instructions have a delay (or latency) that cannot be determined prior to their execution because of the auxiliary processing entailed (e.g., endian swaps), unimplemented forwarding, cache misses, or similar reasons. The most common solution to this problem is a hardware construct called a pipeline interlock. In general, a pipeline interlock detects a hazard and stalls the pipeline until the hazard is cleared. In this case, the interlock stalls the pipeline beginning with the instruction that wants to use the data until the sourcing instruction produces it. This delay cycle, called a pipeline stall or bubble, gives the requisite data time to arrive from memory.

Many types of stalls can occur frequently, depending on the architecture involved. For example, in a single pipeline architecture, the typical code-generation pattern for a statement such as A=B+C produces a stall for a load of the second data value because the addition cannot proceed until the second load has completed (the loads going through an extra stage to account for the accessing of memory). The store need not result in another stall, since the result of the addition can be forwarded to the memory data register. Machines where the operands may come from memory for arithmetic operations will need to stall the pipeline in the middle of the instruction to wait for the memory access to complete.

What is therefore required is a means of dynamically determining the proper latency period between issuing a first instruction and issuing a second instruction dependent on the first instruction. However, the latency period thus selected should be minimized to maximize throughput because a longer latency period equates to a greater number of cycles per completed instruction.

SUMMARY OF THE INVENTION

The present invention solves the problems associated with the prior art by providing at least one latency prediction bit (LPB), which is used to predict the proper latency period between the issuance of a load instruction with which the LPB is associated, and the issuance of one or more dependent instructions (i.e., instructions which require the data being loaded). The latency period should be long enough to ensure that the dependent instruction's execution does not require the data before that data can be made available, but should be no longer than is necessary. The use of an LPB thus allows the dependent instruction to be issued as early as possible, but not so early that the requisite load data cannot be made available in time (which might require a pipeline stall or some other draconian measure).

In a preferred embodiment, the LPB of the present invention is used to select a latency, between issuing a load instruction and issuing a dependent instruction, of either two or three machine cycles. When the load instruction is loaded into a memory location of a memory unit according to the present invention, an LPB associated with that memory location becomes associated with that load instruction and is cleared. Under normal circumstances, the instruction(s) which depend on the load instruction may issue two cycles after that load instruction issues. This situation is indicated by the detection of a cleared LPB at the time the dependencies are determined. The requisite data is made available to the dependent instructions in due course, and the LPB remains cleared. If the LPB is cleared, but the data is not available by the time it is required by the dependent instruction, appropriate actions are taken. These actions include setting the LPB to indicate that the next issuance of the dependent instructions should be delayed by one machine cycle, and re-issuing the load instruction and dependent instruction(s).

If the LPB is set at the time dependencies are determined, this indicates that more time will likely be required to make the requisite data available, and so the issuance of certain dependent instruction(s) should be delayed. An example of instructions affected by such a delay would be dependent instructions that could otherwise execute within a smaller number of machine cycles. These instructions should be issued one or more machine cycles later than they would normally issue to provide the extra time necessary for forwarded data to become available. If it is determined that the extra machine cycle was unnecessary (i.e., the data was provided quickly enough to make the extra machine cycle unnecessary), the LPB is cleared, indicating that the next time the dependent instructions are issued, they should be issued with the normal latency. Used in this manner, the LPB implicitly indicates whether a data dependency is likely to exist and the likelihood of that dependency causing a hazard.

According to one aspect of the present invention, an apparatus for processing instructions is provided. This processor includes an instruction memory and a functional unit. The instruction memory provides several entries, one or more of the entries being capable of storing at least a latency prediction bit and an instruction. The latency prediction bit indicates a latency period with which the instruction should be executed. The functional unit is coupled to the instruction memory and is configured to execute the instruction within a selected latency period. The selected latency period is selected from one of several latency periods, based at least in part on the value of the latency prediction bit.

A further understanding of the nature and advantages of the present invention may be realized by reference to the remaining portions of the specification and the drawings.

DETAILED DESCRIPTION

Introduction

Latency is the time delay between the issuance of an first instruction and the issuance of a subsequent instruction having a dependency relationship with the first instruction (i.e., the subsequent instruction depends on the results of the first instruction). In general, latencies should be minimized for performance reasons. This is a particularly difficult situation to predict because the amount of latency necessary depends on the internal operating state of the given microarchitecture at the time that the first instruction is executed, and in fact may not be completely determined until sometime after the first instruction has been dispatched.

The method of the present invention predicts the latency with which a dependent instruction should be issued through the use of a latency prediction bit (LPB). The LPB indicates the proper latency, implicitly indicating whether a data dependency is likely to exist and the likelihood of that dependency causing a hazard. An instruction dependent upon an instruction (e.g., a load instruction) is issued a number of machine cycles after that load instruction, depending on whether or not it is expected that data will need to be forwarded to the functional unit involved during the execution of the load instruction. If the LPB is set (i.e., it is expected that data will need to be forwarded to properly complete the load instruction), the dependent instruction is issued one or more extra machine cycles later than it would otherwise be. It is important to be able to predict the need for longer latency periods to maintain a pipeline's throughput and to avoid unnecessary cancellations.

An Exemplary Microarchitecture of the Present Invention

Figure 1:
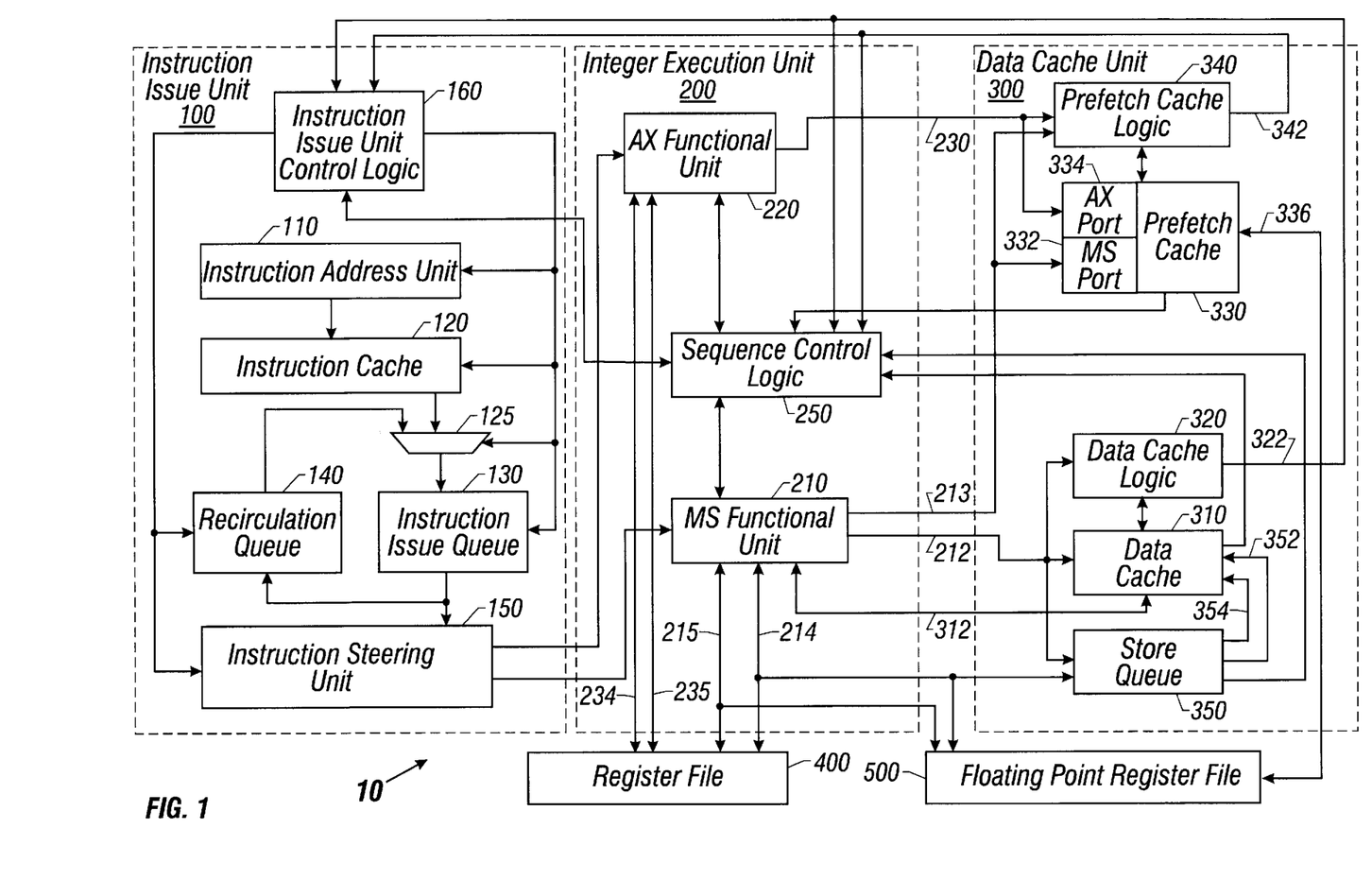
FIG. 1 is a block diagram showing a microarchitecture including architectural constructs according to the present invention.

FIG. 1 illustrates an exemplary microarchitecture 10 according to the present invention, which includes an instruction issue unit 100, an integer execution unit 200, a data cache unit 300, a register file 400, and a floating point register file 500. However, only a subset of the possible structures and data paths microarchitecture 10 might contain are shown in FIG. 1. A fully functional microarchitecture would likely contain additional functional units, data paths, glue logic, and similar architectural constructs. For example, instruction issue unit 100 might contain multiple instruction caches; a floating point unit might be included, as might a graphics unit. The partial microarchitecture shown in FIG. 1 is only for illustrative purposes and is intended only to provide one possible framework in which the method and an apparatus of the present invention might be practiced.

Instructions are fetched by the generation of an address in an instruction address unit 110, which provides an address to an instruction cache 120. Instruction cache 120 then provides the instructions fetched to a multiplexer 125, which in turn provides them to an instruction issue queue 130. Alternatively, multiplexer 125 may select one or more instructions from a recirculation queue 140 may be provided to instruction issue queue 130. Instruction issue queue 130 subsequently provides the instructions to an instruction steering unit 150. These elements are controlled by instruction issue unit control logic 160.

Integer execution unit 200 includes two functional units (i.e., pipelines) and associated logic. The first of these is a memory/special (MS) functional unit 210, which accesses data cache unit 300 by sending addresses to data cache unit 300 over MS DCache address lines 212 and MS PCache address lines 213. MS functional unit 210 reads data from and writes data to register file 400 via MS data lines 214, selecting locations to read from and write to using MS control lines 215. MS data lines 214 and MS control lines 215 are also used to read data from and write data to floating point register file 500.

An AX functional unit 220 is also illustrated as an element of integer execution unit 200. AX functional unit 220 accesses data cache unit 300 by sending addresses to data cache unit 300 over AX address lines 230. AX functional unit 220 reads data from and writes data to register file 400 via AX data lines 234, selecting locations to read from and write to using AX control lines 235. Finally, sequence control logic 250 coordinates functions such as data forwarding and instruction recirculation.

Data cache unit 300 is shown as including two data caches, along with other architectural constructs. A data cache (DCache) 310 is provided to cache data on an as-needed basis and receives control signals from DCache logic 320. DCache 310 receives MS DCache address lines 212 from MS functional unit 210, and communicates data to and from MS functional unit 210 via DCache data lines 312. DCache 310 communicates with and is controlled by DCache logic 320, which also receives MS DCache address lines 212. In turn, DCache logic 320 indicates cache misses (or, conversely, cache hits) to instruction issue unit control logic 160 and sequence control logic 250 via a DCache miss signal 322.

A prefetch cache (PCache) 330 is also provided as part of data cache unit 300. PCache 330 is accessed in the same manner as other caches, but differs in the way data is loaded into the cache. In addition to supporting cache fills in the manner of DCache 310, data may be loaded into PCache 330 (pre-fetched) under either hardware or software control, whether or not the data is needed immediately.

PCache 330 also differs from DCache 310 in that PCache 330 supports accesses by both MS functional unit 210 and AX functional unit 220. MS functional unit 210 accesses an MS port 332 of PCache 330 via MS PCache address lines 213. MS functional unit 210 accesses both caches by presenting the data address to each cache simultaneously. AX functional unit 220 communicates with PCache 330 via AX addresses lines 230, which are connected to an AX port 334. PCache 330 communicates data to floating point register file 500 via PCache data lines 336. MS PCache address lines 213 and AX addresses lines 230 are also provided to prefetch cache logic 340 to allow for the generation of a PCache miss signal 342, among its other control functions (e.g., controlling PCache 330). In turn, PCache miss signal 342 indicates cache misses (or, conversely, cache hits) to instruction issue unit control logic 160 and sequence control logic 250.

Data cache unit 300 also includes a store queue 350, which decouples DCache 310 from MS functional unit 210 when data storage operations are performed by MS functional unit 210. Store queue 350 allows the actual storage of data to proceed at a rate different from that which might otherwise be dictated by the operation of DCache 310 or by that of other data sources. Store queue 350 receives data from MS functional unit 210 via MS data lines 214, and receives addresses via MS DCache address lines 212. Store queue 350 also supports the detection of data hazards in MS functional unit 210, and also supports the forwarding of queued data to various of the elements of microarchitecture 10. Data issuing from store queue 350 is written to DCache 310 using store queue data lines 352 and store queue address lines 354. Although not shown, store queue 350 may also provide data to other architectural elements such as a write queue which supports the transfer of data to external memory.

In operation, microarchitecture 10 is capable of executing many different kinds of instructions (its instruction set). However, the following discussion of the microarchitecture's operation will be limited to the execution of instructions which are benefitted by the present invention. During the execution of any instruction set, an initial step is to fetch the instruction to be executed from the location in which it is stored. In microarchitecture 10, this step is performed by the generation of an instruction address by instruction address unit 110. The instruction's address is communicated to instruction cache 120 which supplies the addressed instruction to a multiplexer 125. This assumes that the instruction to be executed resides in instruction cache 120. If such is not the case, the required instruction may be fetched from external memory (not shown) such as a second-level cache or main memory.

The instruction to be executed is then passed through multiplexer 125 to instruction issue queue 130. Instruction issue queue 130 may be of any depth appropriate to the microarchitecture employed, but the queue's depth will likely be based on the number of stages in the functional units (i.e., pipelines) prior to the pipeline stage at which instructions are dispatched. Instruction issue queue 130 issues the instruction to be executed to both instruction steering unit 150 and recirculation queue 140.

Recirculation queue 140 serves to temporarily store the fetched instructions and maintains their order to provide for the case where an instruction must be canceled from the pipeline to which it is dispatched. In microarchitecture 10, not only is the given instruction canceled, but instructions younger than the canceled instruction may need to be canceled as well. Instruction issue unit control logic 160 and sequence control logic 250 detect the conditions giving rise to the need for instruction recirculation. The canceled instructions must then be re-issued and re-dispatched. This is done by transferring the proper instruction(s) from recirculation queue 140 to instruction issue queue 130 via multiplexer 125. Alternatively, the canceled instruction(s) may simply be re-executed from scratch. In that case, the canceled instruction(s) is re-fetched from instruction cache 120 and re-issued by instruction issue queue 130.

The instructions issued to instruction steering unit 150 are then dispatched to one of the functional units. Instruction steering unit 150 evaluates the resource requirements of the instructions available for dispatch, in conjunction with the currently-available functional unit resources, allocates those resources, and steers the instructions to the staging areas of the corresponding functional units for subsequent execution. In part, this determination is based on the instruction and, possibly, associated informational bits. These informational bits (also known as pre-decode bits) are used to indicate the functional units in which a given instruction may be executed. The selection of acceptable functional units for each instruction is determined during the design of the instruction set and microarchitecture, and is based on the resources required by the given instruction (e.g., access to a translation lookaside buffer (TLB), access to DCache 310, access to other functional units, and similar criteria).

In performing the steering function, instruction steering unit 150 also groups instructions together because each functional unit in microarchitecture 10 is capable of executing only one instruction in any given time slice (although this need not be the case). Thus, instructions grouped together will be executed in a single time slice. A fundamental precept for grouping instructions, then, is that no two instructions in a group may require the use of the same functional unit. (While this is a physical impossibility in microarchitecture 10, it would be an example of a structural hazard.) Instruction steering unit 150 thus dispatches groups of instructions to the functional units (i.e., pipelines) of microarchitecture 10 such that as many functional units as possible are utilized in any one time slice. In microarchitecture 10, the maximum number of instructions in a group is two, because there are only two functional units and each can execute no more than one instruction in a given time slice. With more functional units, greater parallelism could be achieved. For purposes of this discussion, however, the instruction to be executed will be assumed to be executed in one of the functional units shown as part of integer execution unit 200.

The instruction might be, for example, a load integer (LDI) instruction, which loads data representing an integer value into register file 400. MS functional unit 210 executes an LDI instruction by accessing DCache 310 via MS address lines 212. At that time, DCache logic 320 will determine whether the necessary data is stored in DCache 310. If the data is not in DCache 310 (a cache miss occurs), a cache miss is signaled by DCache miss signal 322, and an external cache (not shown) or main memory (also not shown) are accessed. If the requisite data resides in DCache 310, the data is communicated to register file 400 via DCache data lines 312.

Alternatively, the instruction might be a store integer (STO) instruction, which copies data representing an integer value from register file 400 into a memory location. MS functional unit 210 executes a STO instruction by reading the requisite data from the appropriate register in register file 400. That data then travels down the pipeline in MS functional unit 210 until it is written into store queue 350. The data is subsequently transferred to DCache 310 using store queue data lines 352 and store queue address lines 354.

To support the method of the present invention, microarchitecture 10 provides a latency prediction bit (LPB) as part of the data associated with each instruction stored in instruction cache 120 (e.g., in addition to the pre-decode bits associated with each cached instruction). An LPB indicates whether an instruction which depends on a load instruction (specifically, in this example, an LDI instruction) should be issued in two cycles (normal latency) or three cycles (extended latency) after the issuance of the load instruction on which it depends. If an LPB is not used in the execution of the instruction stored in a particular location in instruction cache 120 (i.e., that instruction is not an LDI instruction), the associated LPB is simply ignored. The LPB is initially cleared when an instruction cache line is loaded into the instruction cache.

Figure 2:
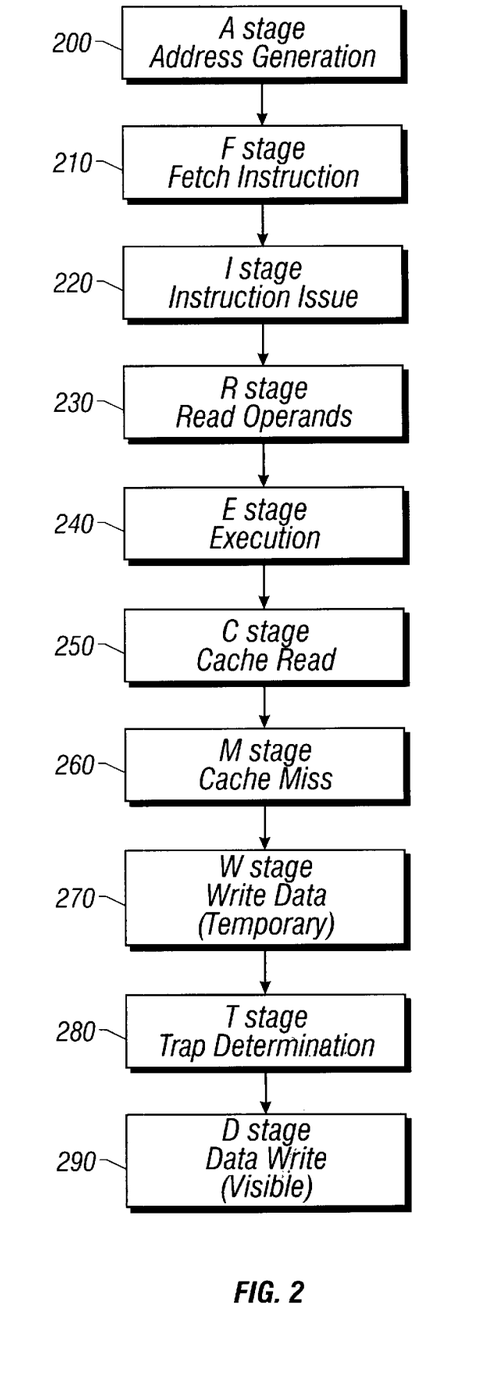
FIG. 2 is a flow diagram showing one embodiment of pipeline stages in which the present invention may be practiced.

FIG. 2 is a flow chart which illustrates an exemplary set of pipeline stages embodied by microarchitecture 10. Instructions proceed through these stages during their execution in microarchitecture 10. Not all instructions perform operations during each of these stages, but each instruction steps through each stage to maintain coherency. For reasons of simplicity, this discussion is limited to the execution of certain instructions in MS functional unit 210. The execution of an instruction begins at step 200 with the generation of an address in instruction address unit 110 in the A stage.

Next, the address thus generated is presented to instruction cache 120 during the instruction fetch (or F) stage (step 210). As part of the F stage, the instruction proceeds to instruction issue queue 130. At step 220, the instruction issues from instruction issue queue 130 during the instruction (or I) stage. During the I stage, the instruction is also dispatched to the proper functional unit by instruction steering unit 150, in this case MS functional unit 210.

According to the method of the present invention, if the instruction issued is a load instruction, the associated LPB is examined. If the LPB is cleared, instructions dependent on the load instruction are allowed to issue after a normal latency period (in microarchitecture 10, two machine cycles). However, if the associated LPB is set, the issuance of those dependent instructions is delayed one or more extra machine cycles (in microarchitecture 10, one extra machine cycle, for a total latency of three machine cycles).

At step 230, operands are read from the register files or other locations during the read operand stage (R stage). The register and functional unit dependencies between the instructions in the present group and with instructions already in one of the functional units are examined concurrently with register file access during the R stage. If a dependency is found, the dependent instruction may be held until the dependency is released.

Once the necessary operands have been read, the instruction is executed during the execution stage (E stage) (step 240). Actions taken during the E stage include the computation of results, including most arithmetic, shift, and the logical operations. Load instructions steered to MS functional unit 210 begin accessing DCache 310 during this stage. Concurrent with the accessing of DCache 310 is the computation of a virtual address used in accessing PCache 330 and in generating the cache miss signals.

The next stage encountered is the cache read stage (C stage), during which certain integer results in the functional units are written to temporary registers and load instructions having normal latency periods have their results delivered (step 250). In such cases, instructions which depend on the results of LDI instructions can be issued with normal latency, such that the data upon which they depend can be expected to be available to the selected functional unit within the minimum latency period.

At step 260, cache misses are detected during the cache miss stage (M stage). For example, this may be done in DCache logic 320 by comparing the results from an associated translation lookaside buffer (TLB) to a physical address contained in an associated cache tag memory. Additionally, loads having an extended latency period complete their operation during this stage. In such cases, instructions which depend on the results of LDI instructions must be issued with extended latency, such that the data upon which they depend can only be expected to be available to the selected functional unit within a latency period greater than the minimum. Thus, while the load instruction takes longer to complete (its results are not available until the M stage), the dependent instruction is issued such that it does not expect the data to be available until that time.

At step 270, data is written to temporary storage areas during the write data stage (or W stage). Also during this stage, exceptional conditions requiring a recirculation of one or more instructions are signaled by sequence control logic 250 to instruction issue unit control logic 160, which in turn generates a recirculation by controlling multiplexer 125 to select recirculation queue 140 as input to instruction issue unit 130. Conditions leading to recirculations include misses in the TLB of instruction cache 120, misses in DCache 310, misses in the TLB of DCache 310, incorrect load predictions, incorrect latency predictions, and other such conditions. Integer traps, as well as other exceptions, are detected at step 280 during the trap detection stage (T stage). At the data write stage (D stage), data is written to one of the register files (step 290). For example, integer results from MS functional unit 210 are written to register file 400. These results are thus visible to any traps from younger instructions which remain in the functional units.

Figure 3:
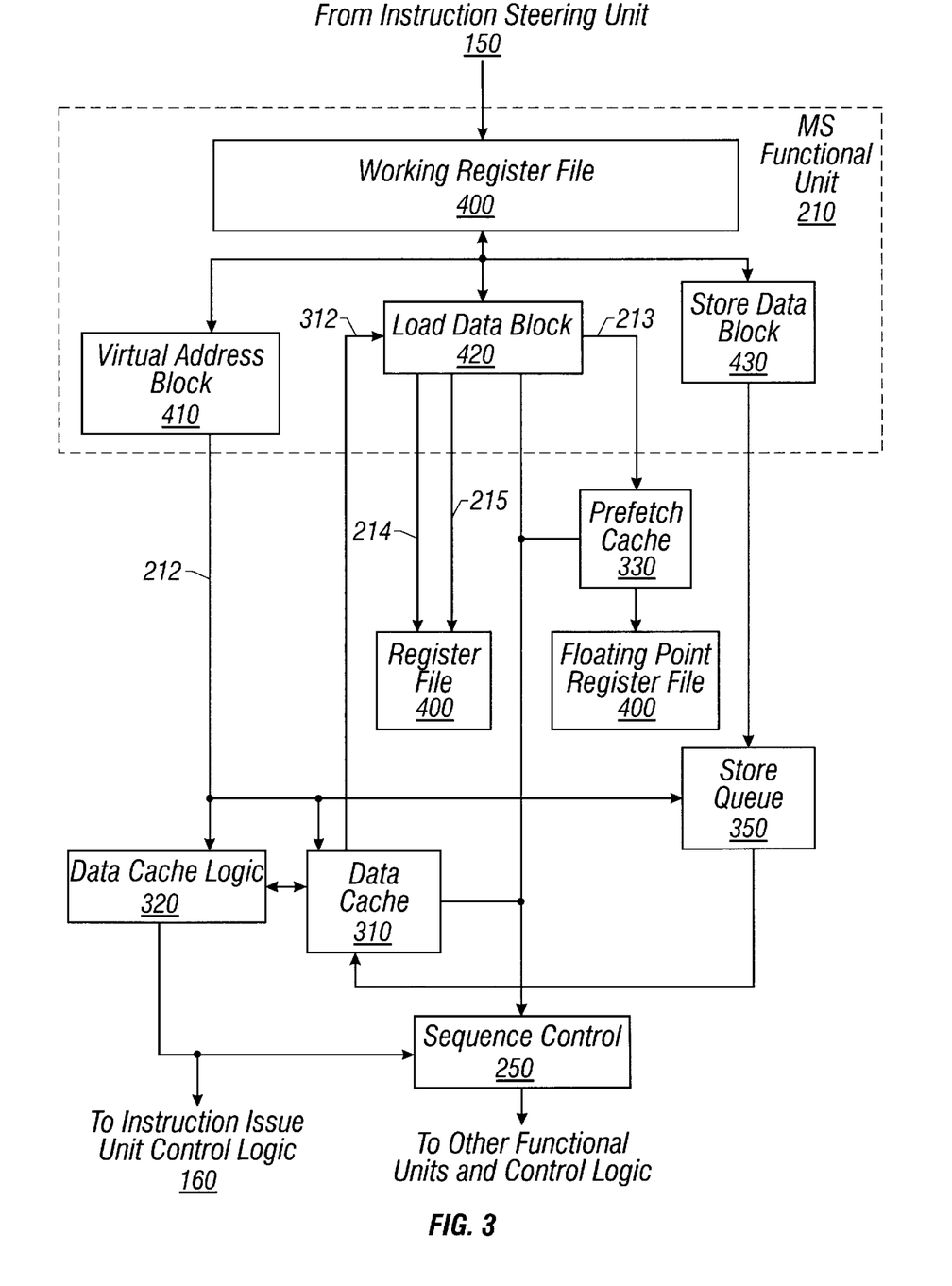
FIG. 3 shows a block diagram of a functional unit supporting the method of the present invention.

To understand the situations giving rise to the hazards addressed by the present invention, a more detailed description of a functional unit within microarchitecture 10 is required. FIG. 3 illustrates the major building blocks of MS functional unit 210, which includes a working register file 400, a virtual address block 410, a load data block 420, and a store data block 430, among others. As indicated in FIG. 1, MS functional unit 210 receives instructions from instruction steering unit 150. These instructions are transferred to working register file 400, which may be shared with AX functional unit 220 or other functional units. Working register file 400 then passes operands to one or more of the functional blocks of MS functional unit 210. Load data block 420 and store data block 430 are described in greater detail below. While MS functional unit 210 is shown as including only four functional blocks, several other functional blocks could be included, and indeed likely are included in an actual implementation. Such functional blocks would include arithmetic units, logical units, and units capable of carrying out other standard functions.

Figure 4:
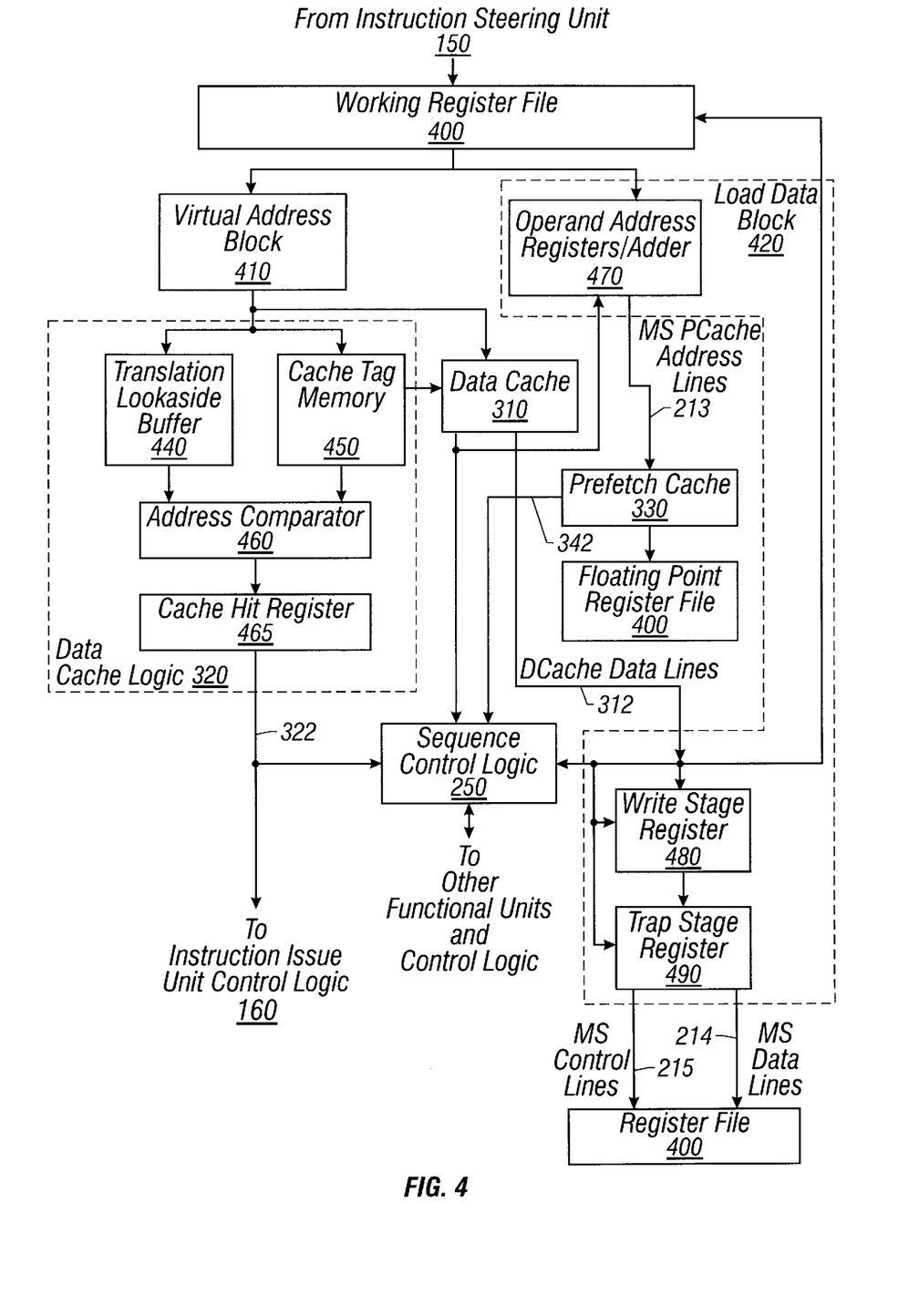
FIG. 4 shows a block diagram illustrating certain details of the functional unit of FIG. 3.

FIG. 4 illustrates load data block 420 and DCache logic 320 in greater detail. As shown in FIG. 4, working register file 400 provides operands both to virtual address block 410 and load data block 420. Virtual address block 410 calculates the proper virtual address and passes this address to DCache logic 320. Data cache logic 320, while shown as including only four functional blocks, likely includes many more facilities for properly managing DCache 310. The virtual address created by virtual address block 410 is provided both to a TLB 440 and to a cache tag memory 450. These units then both provide corresponding versions of a real address to address comparator 460, which compares the two addresses. The results of this comparison are stored in cache hit register 465 so that they may be made available at a later time to sequence control 350 and instruction issue unit control logic 160.

The operands are also sent to operand address registers/adder 470. This permits accessing PCache 330, while also accessing DCache 310. The virtual address calculated by operand address registers/adder 470 is then sent to PCache 330 via MS PCache address lines 213. Assuming the requisite data is stored in PCache 330, it is then loaded into floating point register file 500. Cache misses in PCache 330 are indicated to sequence control logic 250 via PCache miss signal 342.

Virtual address block 410 also supplies a virtual address to DCache 310, thus accessing the requisite data (assuming the data is stored in DCache 310). Otherwise, as noted, a cache miss is generated and indicated on DCache miss signal 322. Assuming the data is stored in DCache 310, the data is transferred to a write stage register 480 of load data block 420 via DCache data lines 312. DCache miss signal 322 is provided to sequence control 350 to allow MS functional unit 210 to properly handle cache misses in DCache 310. Microarchitecture 10 handles cache misses in DCache 310 by recirculating the load instruction involved using recirculation queue 140 under the control of instruction issue unit control logic 160, in the manner previously described. Alternatively, the instruction(s) may be re-fetched, as also previously described. This recirculation not only allows MS functional unit 210 to continue processing instructions (as opposed to the pipeline stall required in some microarchitectures), but also provides the delay necessary to allow the completion of the external memory access thus generated.

While the data is held in write stage register 480, it is written to working register file 400 for use by subsequent instructions. The data then proceeds to a trap stage register 490, after which it is presented to register file 400 using MS data lines 214 and MS control lines 215. The data is actually written to register file 400 during the D stage.

If a cache miss occurs in DCache 310, the requisite data may still be available elsewhere in microarchitecture 10. For example, the data may reside in a stage of AX functional unit 220 or another stage of MS functional unit 210. Often, sequence control logic 250 is able to forward the data required to one of the stages of load data block 420, such as operand address registers/adder 470, W stage register 480, or T stage register 490. Data may also be forwarded from within DCache 310 or from DCache data lines 312, among other sources, for use by other elements of microarchitecture 10 (e.g., AX functional unit 220). However, such forwarding is not always possible due to the lack of specific forwarding paths. Such situations can consume a measurable amount of time. Thus, an instruction dependent upon a load instruction must be forced to wait until the data will be available. This functionality is provided by the LPB of the present invention.

Figure 5:
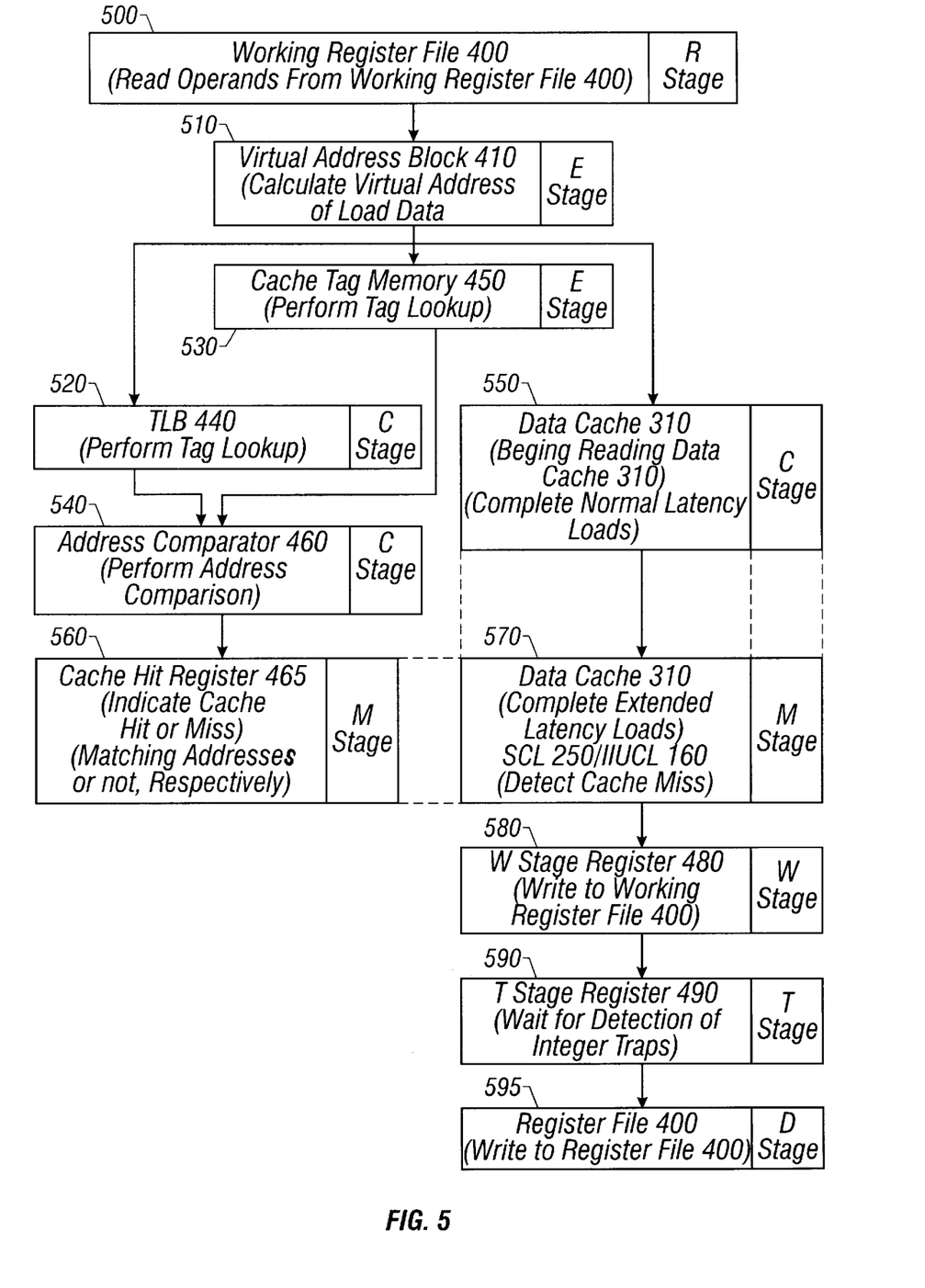
FIG. 5 shows a flow diagram illustrating the operation of the circuitry represented by the block diagram of FIG. 4.

FIG. 5 illustrates a flow diagram of the actions taken during the various pipeline stages encountered during the execution of an LDI instruction in MS functional unit 210. Each block representing a pipeline step includes both a description of the actions completed during that step and the pipeline stage at which the operation(s) are carried out. The steps indicate both functional block in which the operation is conducted and the operation performed (in parentheses).

At step 500, working register file 400 is accessed and the operands for the current instruction are read. This occurs the R stage. In executing an LDI instruction, two steps are performed during the E stage. At step 510, virtual address block 410 calculates the virtual address of the data to be loaded. This virtual address is passed to cache tag memory 450 during the E stage, where a table lookup is performed for the given virtual address period during the C stage (step 530).

During the next pipeline stage, the C stage, several operations are performed. At step 520, TLB 440 is accessed using the virtual address generated by virtual address block 410 to perform a table look up as part of the detection of cache hits and misses. Also during the C stage, address comparator 460 performs an address comparison between the results of steps 520 and 530 (step 540). Data cache 310 is also read during the C stage (step 550), at which time LDI instructions having normal latency are expected to complete, assuming that a cache hit occurs.

Cache hits (or, conversely, misses) are detected during the M stage. At step 560, the results from address comparator 460 are read into cache hit register 465, thus indicating a cache hit (or miss) to certain of the elements of microarchitecture 10. For example, this is indicated in FIG. 5 by dashed lines connecting step 560 to a concurrent step (step 570). At step 570, the cache hit or miss is detected by sequence control logic 250 and instruction issue unit control logic 160. Also during the M stage, extended latency loads are completed in DCache 310. Dashed lines connect steps 550 and 570 to indicate that these two steps are performed in DCache 310.

During the W stage, the results of the data access are written into working register file 400 and also into the W stage register (step 580). The functional units of microarchitecture 10 often contain registers which merely serve as temporary storage locations for operands, instructions, and data traversing the pipelines, and serve primarily to maintain coherency within the functional units. Without such registers, the data paths of the various instructions executed by microarchitecture 10, many of which differ significantly in their completion times, would present their results in an inappropriate order. By inserting registers into the functional units of microarchitecture 10, the number of cycles required to execute a given instruction may be controlled, allowing the functional units of microarchitecture 10 to proceed in an orderly manner. The T stage register, also implemented to maintain such order, holds the current results while waiting for the detection of interrupts (also known as traps) (step 590). In the case of MS functional unit 210, the traps being detected are integer traps. Finally, data is written to register file 400 during the D stage (step 595).

Figure 6:
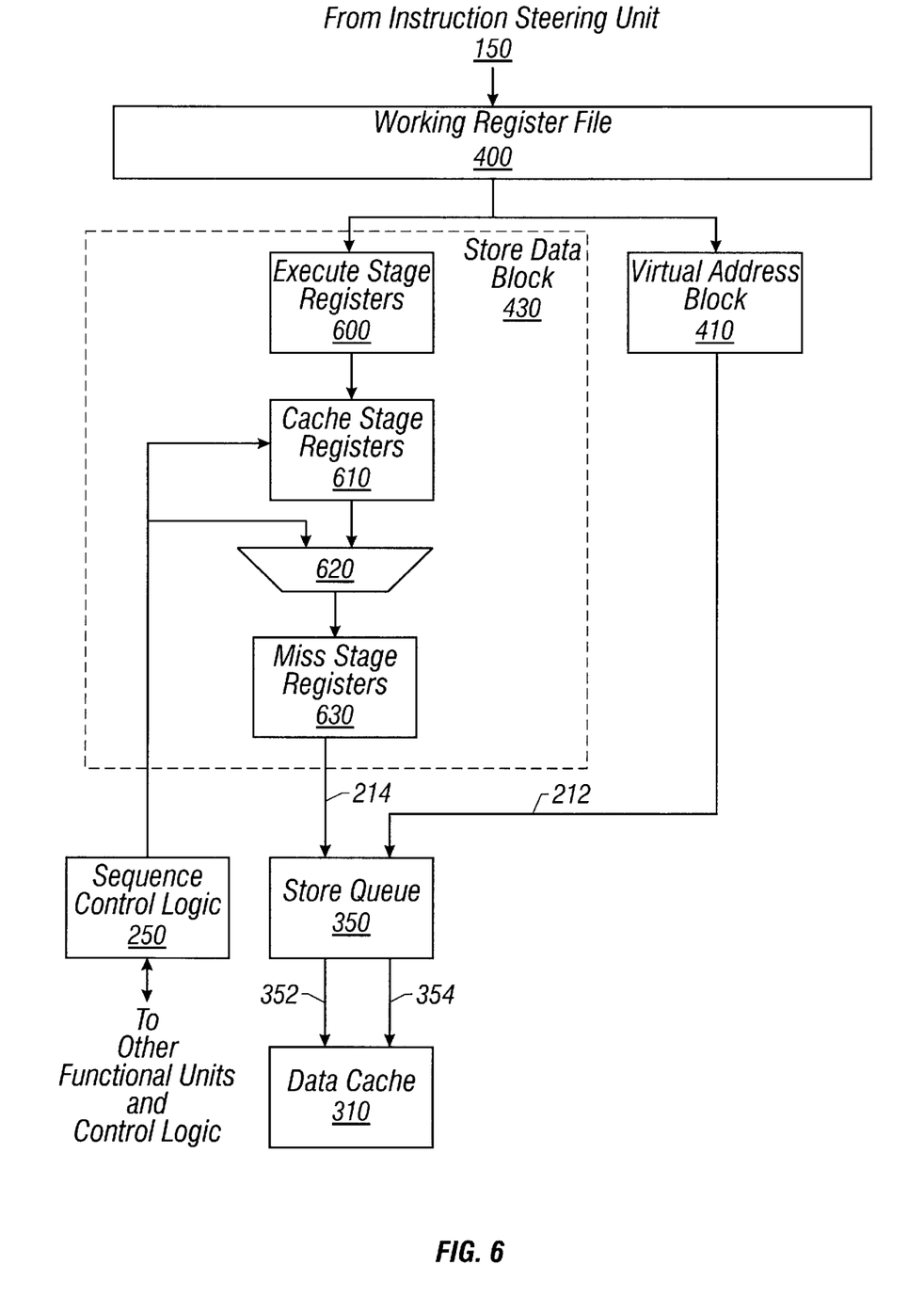
FIG. 6 shows a block diagram illustrating certain other details of the functional unit of FIG. 3.

FIG. 6 illustrates store data block 430 in greater detail. A block diagram of store data block 430, FIG. 6 is also described in terms of the steps involved in the processing of a store integer (STO) instruction in MS functional unit 210. As before, operand addresses of the STO instruction are first transferred from instruction steering unit 150 to working register file 400 during the R stage. During the E stage, these operand values are passed to execute stage registers 600 within store data block 430. In the case of an STO instruction, one of the operands may be the actual data to be stored or the location of that data, with the other operand being the data's destination address. Alternatively, a three operand instruction format may be used, with the register and two memory address operands supported. The registers within store data block 430, as with certain of the registers previously described, hold data simply to maintain the coherency of operations within MS functional unit 210 and to allow more recent versions of the data to be forwarded into the pipeline.

Next, the data is passed to cache stage registers 610. Additionally, data may be forwarded from various locations within microarchitecture 10 (e.g., various stages within AX functional unit 220). This is done via sequence control logic 250, which receives the data from various sources and passes it to multiplexer 605, which in turn supplies the data to cache stage registers 610. The output of cache stage registers 610 is then fed into a multiplexer 620 which also receives forwarded data from sequence control logic 250. These two paths from sequence control logic 250 into the data path of stored data block 430 exist because data from various sources within microarchitecture 10 may be available at different times (i.e., during different pipeline stages), depending on the source of the data. Thus, certain sources may be able to present data for forwarding earlier (e.g., at the C stage for cache stage registers 610), or may only be able to provide the data at a later time (e.g., during the M stage, as is the input to multiplexer 620).

The data selected by multiplexer 620 is then passed to miss stage registers 630 during the M stage of the pipeline. At this point, the data is ready to be stored in DCache 310. However, because DCache 310 may be accessed by several different functional units and because DCache 310 may not be able to store data at a rate fast enough to allow the various functional units of microarchitecture 10 to maintain the necessary level of throughput, data is passed to store queue 350 via MS data lines 214. The location in which this data is to be stored is provided by virtual address block 410 via MS DCache address lines 212. Store queue 350 stores the data in its intended memory location, and subsequently passes this information to DCache 310 via store queue data lines 352 and store queue address lines 354. Alternatively, store queue 350 may provide this information to external memory, possibly via another decoupling queue such as a write queue (not shown).

As FIGS. 3–6 and their descriptions illustrate, numerous actions are performed in MS functional unit 210 in the successful execution of instructions such as LDI and STO instructions. Because these instructions may be in various stages of completion at any one time, the occurrence of a data hazard in microarchitecture 10 is a distinct possibility. For example, an RAW hazard might be created by the execution of an STO instruction, followed by the execution of an LDI instruction. If data written to store queue 350 by the STO instruction during the M stage has not yet been written to DCache 310 when the LDI instruction reaches the C stage and attempts to access that data, an RAW hazard results. In that case, the most recent value of the load data is probably not available to be forwarded to the LDI instruction, nor can it be loaded from DCache 310. This situation requires that the LDI instruction (and possibly one or more younger instructions) be recirculated. The requisite data is then expected to have been written to DCache 310 by the time the LDI instruction is re-executed, although it is possible that further recirculations will be necessary.

However, the requisite data may be available for forwarding. For example, the data to be loaded by an LDI instruction may exist in one of the functional units of microarchitecture 10 due to the execution of an instruction altering its value (e.g., an arithmetic function such as an ADD instruction). If this value has not yet been written to DCache 310, an RAW hazard may exist. However, if the data is available at a point within microarchitecture 10 from which it may be forwarded, the RAW hazard may be avoided. A RAW hazard may also be avoided by allowing forwarding from the involved elements (e.g., store queue 350). The forwarding of data is not instantaneous, however, and extra time must be provided for such a load (in essence, a load from some point within microarchitecture 10) to complete. The issuance and execution of subsequent equations must therefore be delayed to provide for such a situation.

The function of the LPB of the present invention is to predict this need, based on past experience. In such a case, an LPB associated with the LDI instruction should be set, indicating that a delay should be inserted between issuing the LDI instruction and issuing the instruction(s) dependent on that LDI instruction, allowing additional time for the requisite data to be forwarded to the functional unit executing the dependent instruction. Conversely, if no data forwarding need be performed, the LPB should be cleared.

Figure 7:
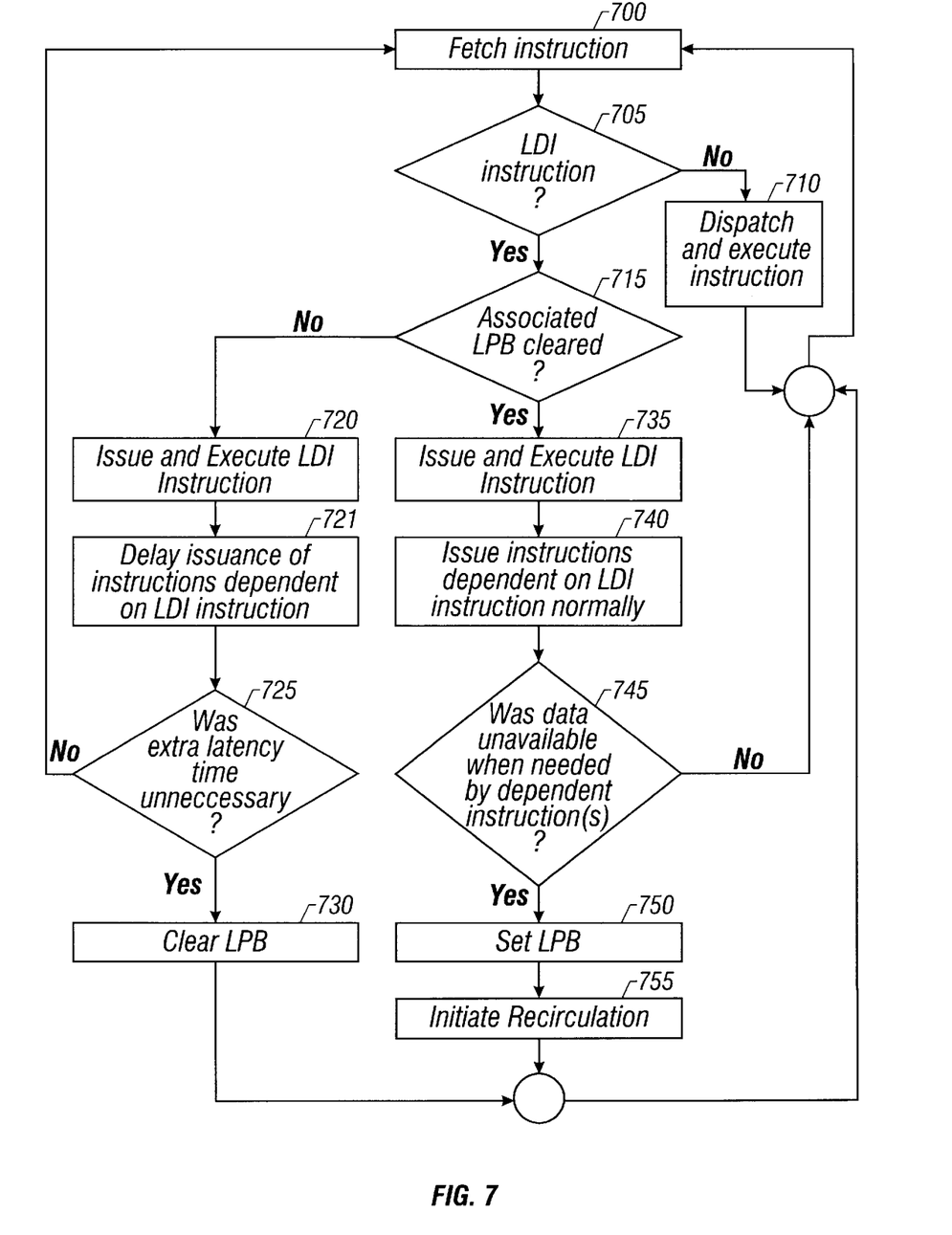
FIG. 7 is a flow diagram showing one embodiment of the method according to the present invention.

FIG. 7 illustrates this paradigm in greater detail. The flow diagram of FIG. 7 is primarily concerned with the execution of LDI instructions and, in particular, presents the criteria by which decisions are made as to the proper latency with which such LDI instructions should be executed. As before, a microarchitecture such as microarchitecture 10 would capable of executing many different instructions, and each would have its own set of execution steps. As with any instruction decoding process, however, the first step is to fetch the instruction to be executed (step 700). At this time, one or more instructions are fetched from instruction cache 120. At the same time, pre-decode bits (e.g., an associated LPB) are also retrieved. Not indicated in step 700 are the normal procedures which are performed in cases of cache misses, such as multiple instruction (cache line) loads and the like.

The instruction(s) are loaded into instruction issue queue 130 as part of step 700. The instruction to be executed subsequently passes from instruction issue queue 130 to instruction steering unit 150, which determines if the instruction is an LDI instruction (step 705). If the instruction is not an LDI instruction, the instruction fetched is dispatched and executed normally (step 710). Instruction processing then proceeds at step 700.

If the instruction fetched was an LDI instruction, then the latency prediction bit (LPB) associated with that instruction in instruction cache 120 is examined (step 715). If the associated LPB is set (i.e., the associated LPB is not cleared), processing continues at step 720, where the LDI instruction is issued, and subsequently executed. At step 721, the issuance of any instructions dependent upon the LDI instruction is delayed for a period of time in excess of the normal delay between the two instructions. In microarchitecture 10, this amounts to delaying the issuance of the dependent instruction(s) by one machine cycle, but a longer delay could be used, if needed. This increases the latency between the LDI instruction and the dependent instruction. The issuance of the instruction dependent on the LDI instruction is delayed for one (or more) machine cycles longer than the normal latency period to permit the forwarding of data.

A good example of such a situation is a RAW hazard. The special data paths in microarchitecture 10 controlled by sequence control logic 250 support the forwarding of data stored in various locations in microarchitecture 10 when such hazards exist. Their use adds one machine cycle to the normal latency between an LDI instruction and a dependent instruction, although this latency may be of any duration. This extra time is required by microarchitecture 10 and, in particular, sequence control logic 250, to forward data from other points in microarchitecture 10 to MS functional unit 210 so that the proper data is retrieved by the LDI instruction. In such a case, the control structures of microarchitecture 10 will not expect a result to be available for forwarding for at least one additional machine cycle.

Unfortunately, the detection of a RAW hazard is not possible until after the LDI instruction has entered the functional unit (e.g., MS functional unit 210) and computed the address of the data to be loaded. Thus, an LPB allows this decision to be made early in the machine cycle. Fortunately, RAW hazards are relatively rare during program execution. Because of this, and the fact that LDI instructions are frequently followed by instructions which use the data loaded, it is desirable that LDI instructions be executed at their normal latency whenever possible. Thus, the LPB associated with an LDI instruction is cleared upon loading the instruction into instruction cache 120 and is set only when the extra latency was required in the preceding issuance and execution of the LDI and dependent instruction (s).

At step 725, sequence control logic 250 and instruction issue unit control logic 160 are used to determine whether the result generated by the LDI instruction was actually available for use by the dependent instruction(s) within the normal latency period, indicating that the extra time provided was not (or was) necessary. Implicitly, this also indicates whether or not the forwarding of data was actually required. If the extra time was required (i.e., data forwarding was performed), the LPB is left unchanged (i.e., set), and processing continued (step 700). Otherwise, the associated LPB is cleared, indicating that (at least for the last execution of these instructions), extended latency between the issuance of the LDI instruction and its dependent instruction(s) was unnecessary. In this case, when the instructions are next issued and executed, the normal latency will be used, thus maximizing throughput.

If the associated LPB is cleared (step 715), this indicates that the dependent instruction is to be issued with normal latency. By normal latency, it is meant that the issuance of an instruction dependent on the LDI instruction need not be delayed to allow for data forwarding. In this case, the data loaded can be expected to be received from DCache 310 in due course, assuming that the data is stored therein. of course, if the data to be loaded is not stored in DCache 310, an external memory access will have to be performed, which will involve a data cache fill recirculation. The data cache fill recirculation will be initiated by sequence control logic 250 and instruction issue unit control logic 160, and will cause the LDI instruction which generated the cache miss (and certain younger instructions currently in MS functional unit 210) to be recirculated by recirculation queue 140, which is selected by multiplexer 125 as input to instruction issue unit 130. The LDI is then issued, and subsequently executed at step 735. At step 740, the dependent instructions are issued with normal latency (e.g., two machine cycles after the LDI instruction is issued).

At step 745, it is determined whether the data was available to the dependent instructions by the time that data was needed for their proper execution. These comparisons are made, for example, to determine whether an RAW hazard might have occurred. If the data was available in time, processing proceeds normally at step 700.

However, if the data was not available in time for use by the dependent instructions, the LDI instructions and those dependent upon it will require re-execution. This is done in microarchitecture 10 by recirculating the instructions involved. If the LDI instruction requires recirculation (i.e., the data dependency caused an RAW hazard), the associated LPB is set at step 750. A recirculation is then initiated at step 750 by sequence control logic 250. The LDI instruction and dependent instructions are recirculated from recirculation queue 140 through multiplexer 125 to instruction issue queue 130 under the control of instruction issue unit control logic 160. This permits the instructions to be executed with the proper latency.

Thus, the method of the present invention employs the LPB to adjust the latency between issuing a load instruction and dependent instructions. The LPB also indicates, to some degree, whether a data dependency exists and whether that data dependency is likely to create a hazard. It is important to be able to predict the occurrence of such hazards to maintain throughput through the functional units of microarchitecture 10 and to avoid unnecessary recirculations, which are costly in terms of machine cycles.

The latency prediction performed in microarchitecture 10 through the use of the latency prediction bit has only one of two different values. An instruction dependent upon a given LDI instruction is issued either two or three machine cycles after the that LDI instruction, depending on whether or not it is expected that data will need to be forwarded to MS functional unit 210 during the execution of LDI instructions, although different latencies may be used in practice. Again, however, the dependent must be affected by the need for extra latency time (i.e., the dependent instruction must be able to issue with the normal latency period and be unable to do so due to the microarchitecture's need for extra latency time).

While the method of the present invention may be used to determine the resources required to execute an instruction, it is particularly suited to determining the most probable latency required to properly execute instructions dependent on a given LDI instruction. Microarchitecture 10 is therefore structured to permit such distinctions. To that end, sequence control logic 250 supports the forwarding of data to and from several points within microarchitecture 10; instruction issue unit control logic 160 controls multiplexer 125 to recycle instructions if the latency prediction was incorrect; and cache miss signals are provided to instruction issue unit control logic 160 and sequence control logic 250. This allows instruction issue unit control logic 160, in concert with sequence control logic 250, to determine the appropriate latency for a given LDI instruction and to dispatch the instruction related to that LDI instruction appropriately.

The present invention may be extended by using multiple LPBs to predict the need for one of several latency periods. For example, in microarchitecture 10, a single LPB is used to provide extra time for data forwarding to be performed. However, because no forwarding can be done from store queue 350, if the most recent data is in store queue 350, recirculations must be performed until that data is available from DCache 310. A logical extension of the present invention would be to permit forwarding from store queue 350. Because this would likely be a more time consuming operation than forwarding from a stage in another functional unit, two LPBs might be used to indicate the length of latency required to permit data forwarding, based on the source of the data being forwarded (e.g., AX functional unit 220 or store queue 350). Thus, three latencies would be available (e.g., two, three, or four machine cycles).

The present invention may also be extended to permit the prediction of whether data loaded by a non-LDI load instruction (e.g., a load floating point (LDF) instruction) will be found in one of two caches, with an acceptable degree of certainty. This use of the present invention, in which the latency prediction bit is used as a load prediction bit (also LPB), associates an LPB with each instruction stored in instruction cache 120, as in the present invention. However, when associated with an LDF instruction, the LPB indicates a likely location of data among a number of on-chip memories. The load prediction bit is used by instruction issue unit 150 to assign the instruction to a functional unit. Preferably, the instruction is assigned based on (1) which functional units have access to the memory where the data to be retrieved is predicted to be, and (2) the ability to maximize functional unit usage by avoiding using a functional unit needed by a particular instruction.

Having fully described the preferred embodiments of the present invention, many other equivalent or alternative methods of implementing latency prediction according to the present invention will be apparent to those skilled in the art. For example, the method of the present invention is not limited to the microarchitecture illustrated in FIG. 1. Microarchitecture 10 is a load/store architecture, meaning that data must be loaded into a register in the register file prior to any operations being performed on it. However, other architectures may benefit from the present invention. For example, a register/memory architecture, in which data may be operated on while still in memory, could be designed to take advantage of the present invention. Also, many more functional units (e.g., floating point, graphics, and possibly others) would likely be included in microarchitecture 10. Out-of-order execution might also be supported. Several latency prediction bits might be employed, thus providing numerous possible levels of latency. Instructions other than LDI instructions might benefit from the present invention, maintaining pipeline flow in the face of various possible hazards. These equivalents and alternatives, and others, are intended to be included within the scope of the present invention.

What is claimed is:

1. A processor comprising:
   an instruction memory having a plurality of entries, a latency prediction bit and a first instruction being stored in one of said plurality of entries;
   an instruction issue unit, coupled to said instruction memory, said instruction issue unit configured to issue a second instruction a period of time after issuing said first instruction, said period of time being determined at least in part by a value of said latency prediction bit;
   a first functional unit, coupled to said instruction issue unit and configured to execute said first and said second instructions; and
   control logic, coupled to said first functional unit and said instruction memory, configured to cause said latency prediction bit to assume, upon execution of at least said first instruction,
      a value that indicates said period of time is of a first duration, if a result of said first instruction was not available prior to a point in time when said result was needed for execution of said second instruction, and
      a value that indicates said period of time is of a second duration, if said result was available prior to said point in time.

2. The processor of claim 1 wherein said instruction issue unit includes an instruction issue queue and a recirculation queue, and said instruction issue queue is coupled to
   said functional unit,
   said instruction memory,
   an output of said recirculation queue at an input of said instruction issue queue, and
   an input of said recirculation queue at an output of said instruction issue queue.

3. The processor of claim 1 wherein said control logic is further configured to
   set said latency prediction bit, if said second instruction uses said result, said result is not available prior to execution of said second instruction, and said latency prediction bit was previously cleared,
   clear said latency prediction bit, if said second instruction uses said result, said result is available prior to execution of said second instruction, and said latency prediction bit was previously set, and
   leave said latency prediction bit unchanged, otherwise.

4. The processor of claim 2 wherein said control logic is further configured to transfer said first and said second instructions to said recirculation queue from said instruction issue queue if said result was not available prior to said point in time.

5. The processor of claim 3 wherein, upon a subsequent execution of said first and second instructions by said first functional unit,
   said period of time is a first duration in length if said latency prediction bit is set,
   said period of time is a second duration in length if said latency prediction bit is cleared, and
   said first duration is longer than said second duration.

6. The processor of claim 3 wherein said processor further comprises a second functional unit, coupled to said instruction issue unit and configured to execute said second instruction.

7. The processor of claim 6 wherein, upon a subsequent execution of said first and second instructions,
   said period of time is a first duration in length if said latency prediction bit is set,
   said period of time is a second duration in length if said latency prediction bit is cleared, and
   said first duration is longer than said second duration.

8. The processor of claim 1 wherein
   said processor further comprises a plurality of functional units,
   said instruction issue unit is coupled to each one of said plurality of functional units and is configured to issue said first instruction to any one of said plurality of functional units, wherein
      said first instruction is issued to and is executed on a first one of said plurality of functional units, and
      said second instruction uses a result of said first instruction.

9. The processor of claim 8 wherein
   said period of time is a first duration in length if said latency prediction bit is set,
   said period of time is a second duration in length if said latency prediction bit is cleared, and
   said first duration is longer than said second duration.

10. The processor of claim 9 wherein said second instruction is issued to said first one of said plurality of functional units,
   an output of said first one of said plurality of functional units is coupled to an input of said first one of said plurality of functional units,
      said first one of said plurality of functional units is configured to forward said result from said output to said input, and
      said first duration is of such length that said result may be forwarded from said output to said input prior to said point in time.

11. The processor of claim 9 wherein said second instruction is issued to a second one of said plurality of functional units, an output of said first one of said plurality of functional units is coupled to an input of said second one of said plurality of functional units, said first one of said plurality of functional units is configured to forward said result from said output to said input, and said first duration is of such length that said result may be forwarded from said output to said input prior to said point in time.

12. A method for executing a first instruction and a second instruction in a processor, the second instruction using a result of the first instruction, the processor including an instruction cache, the instruction cache storing the first instruction and a latency prediction bit associated with the first instruction, the processor including an instruction issue unit, coupled to the instruction cache, the processor including a functional unit, coupled to the instruction issue unit, comprising the steps of:

determining if the first instruction is of a particular instruction type; and if the first instruction is of said particular instruction type, determining if the latency prediction bit is cleared, and, if the latency prediction bit is cleared, issuing the first instruction to the functional unit, executing the first instruction in the functional unit, issuing the second instruction a first period of time after issuing the first instruction, determining if the result was not available for use by the second instruction prior to the execution of the second instruction, and if the result was not available prior to the execution of said second instruction, re-issuing at least the first instruction and setting the latency prediction bit, and, if the latency prediction bit is set, issuing the first instruction to the functional unit, executing the first instruction in the functional unit, issuing the second instruction a second period of time after issuing the first instruction, determining if the result was available for use by the second instruction within said first period of time of issuing the first instruction, and, clearing the latency prediction bit, if the result was available for use by the second instruction within said first period of time of issuing the first instruction.

13. The method of claim 12 wherein the load prediction bit is cleared upon the first instruction being loaded into the instruction cache.

14. The method of claim 12 wherein the instruction issue unit includes an instruction issue queue and a recirculation queue, the instruction issue queue is coupled to the instruction cache, the recirculation queue, and the functional unit and the step of re-issuing the instruction further comprises the steps of:

recirculating the first instruction from the recirculation queue to the instruction issue queue;

issuing the instruction from the instruction issue queue to the functional unit; and executing the instruction in the functional unit.

15. The method of claim 14 wherein said second period of time is longer than said first period of time.

16. The method of claim 15 wherein said first period of time is two machine cycles in duration and said second period of time is three machine cycles in duration.

17. The method of claim 12 wherein the step of re-issuing the instruction further comprises the steps of:

fetching the first instruction from the instruction cache into the instruction issue unit;

issuing the first instruction to the functional unit; and executing the instruction in the functional unit.

18. The method of claim 17 wherein said second period of time is longer than said first period of time.

19. The method of claim 18 wherein said first period of time is two machine cycles in duration and said second period of time is three machine cycles in duration.

20. A computer system, said computer system comprising:

a bus;

a memory, coupled to said bus; and a processor, coupled to said bus, including:

an instruction memory having a plurality of entries, a latency prediction bit and a first instruction being stored in one of said plurality of entries;

an instruction issue unit, coupled to said instruction memory, said instruction issue unit configured to issue a second instruction a period of time after issuing said first instruction, said period of time being determined at least in part by a value of said latency prediction bit;

a first functional unit, coupled to said instruction issue unit and configured to execute said first and said second instructions; and control logic, coupled to said first functional unit and said instruction memory, configured to cause said latency prediction bit to assume, upon execution of at least said first instruction, a value that indicates said period of time is of a first duration, if a result of said first instruction was not available prior to a point in time when said result was needed for execution of said second instruction, and a value that indicates said period of time is of a second duration, if said result was available prior to said point in time.

* * * * *